Figure 1:
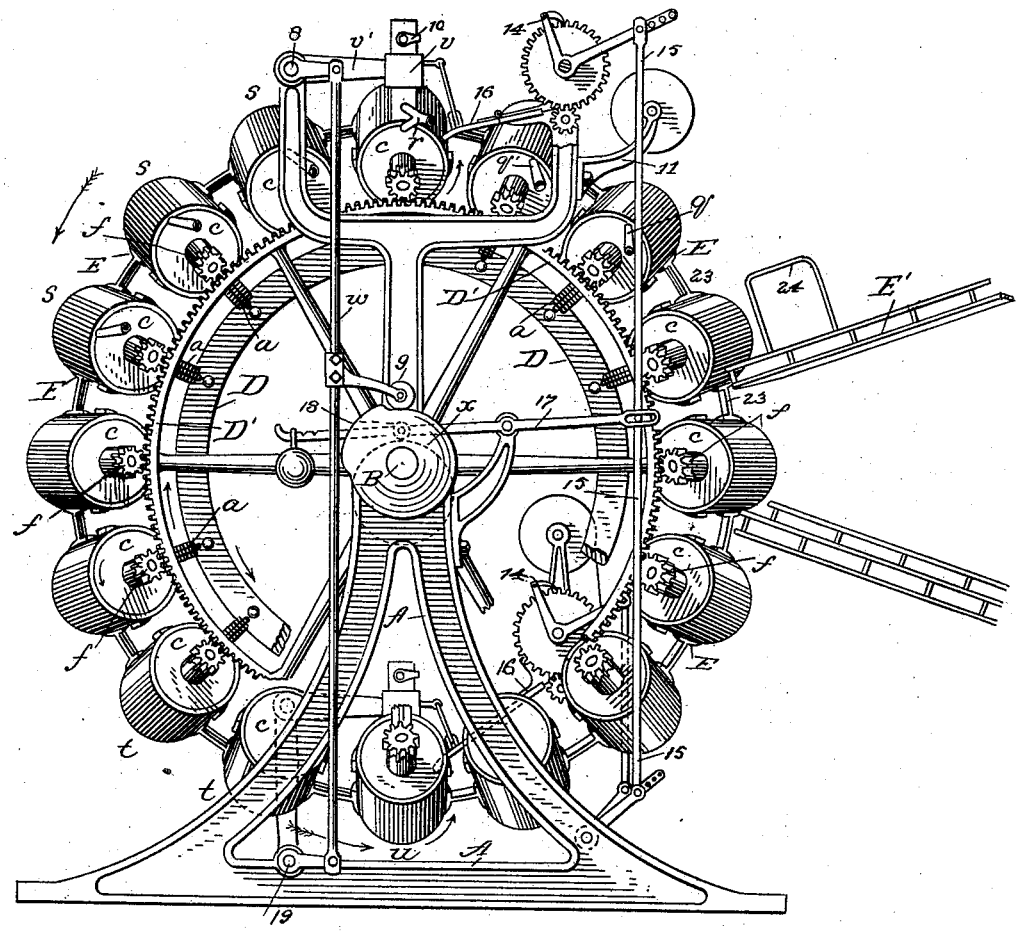

(No Model.) 3 Sheets—Sheet 1.

W. D. BROOKS.
CAN SOLDERING MACHINE.

No. 352,034. Patented Nov. 2, 1886.

Attest: Walter Donaldson
F. L. Middleton

Inventor: Wm D. Brooks
by Ellis Spear
Atty.

(No Model.) 3 Sheets—Sheet 2.
W. D. BROOKS.
CAN SOLDERING MACHINE.
No. 352,034. Patented Nov. 2, 1886.
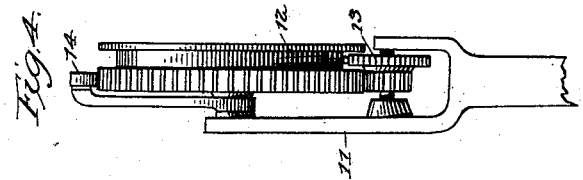
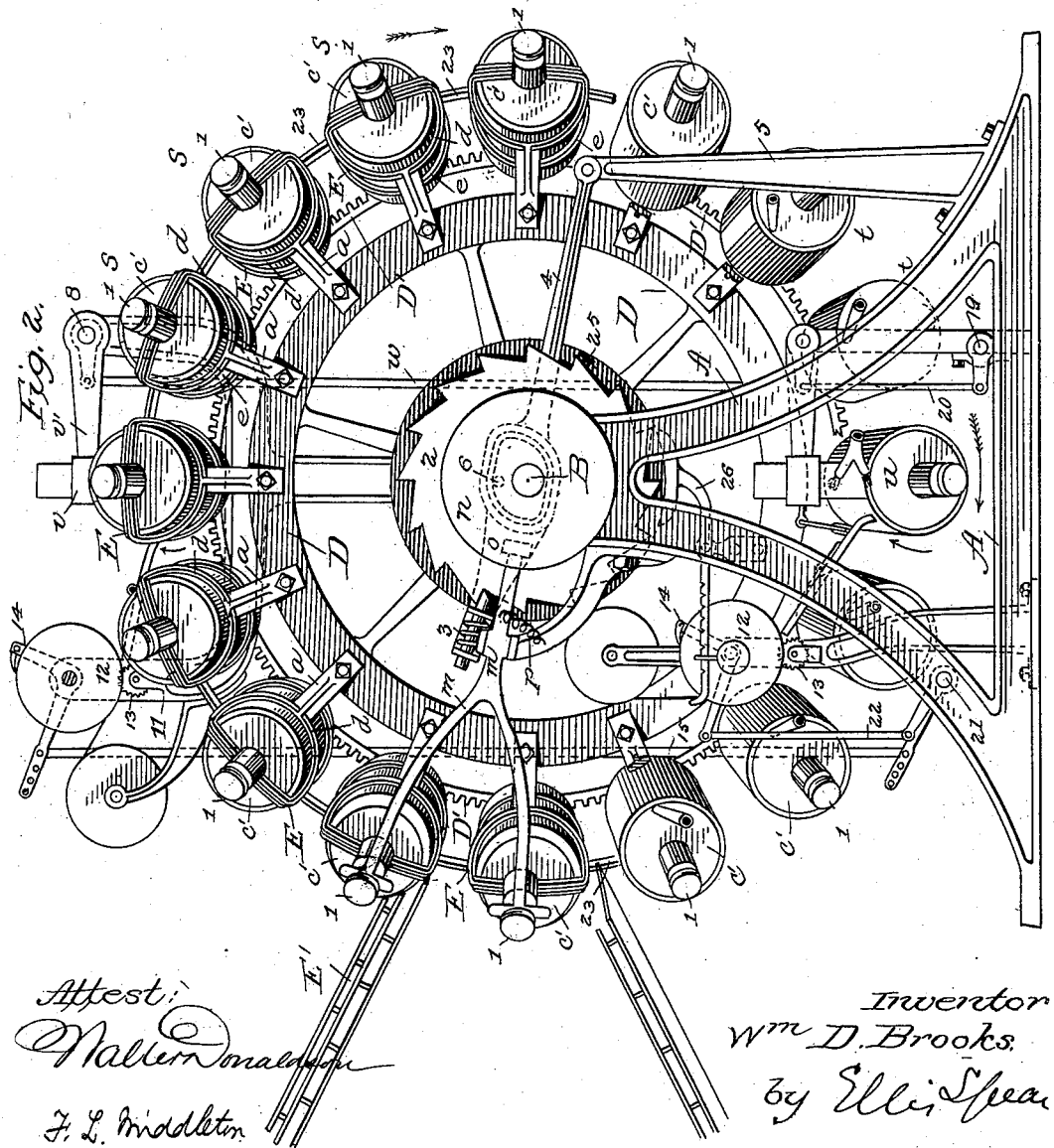
Attest:
Walter Donaldson
F. L. Middleton
Inventor
Wm D. Brooks.
by Ellis Spear
Atty.
N. PETERS, Photo-Lithographer, Washington, D. C.

(No Model.) 3 Sheets—Sheet 3.
W. D. BROOKS.
CAN SOLDERING MACHINE.
No. 352,034. Patented Nov. 2, 1886.
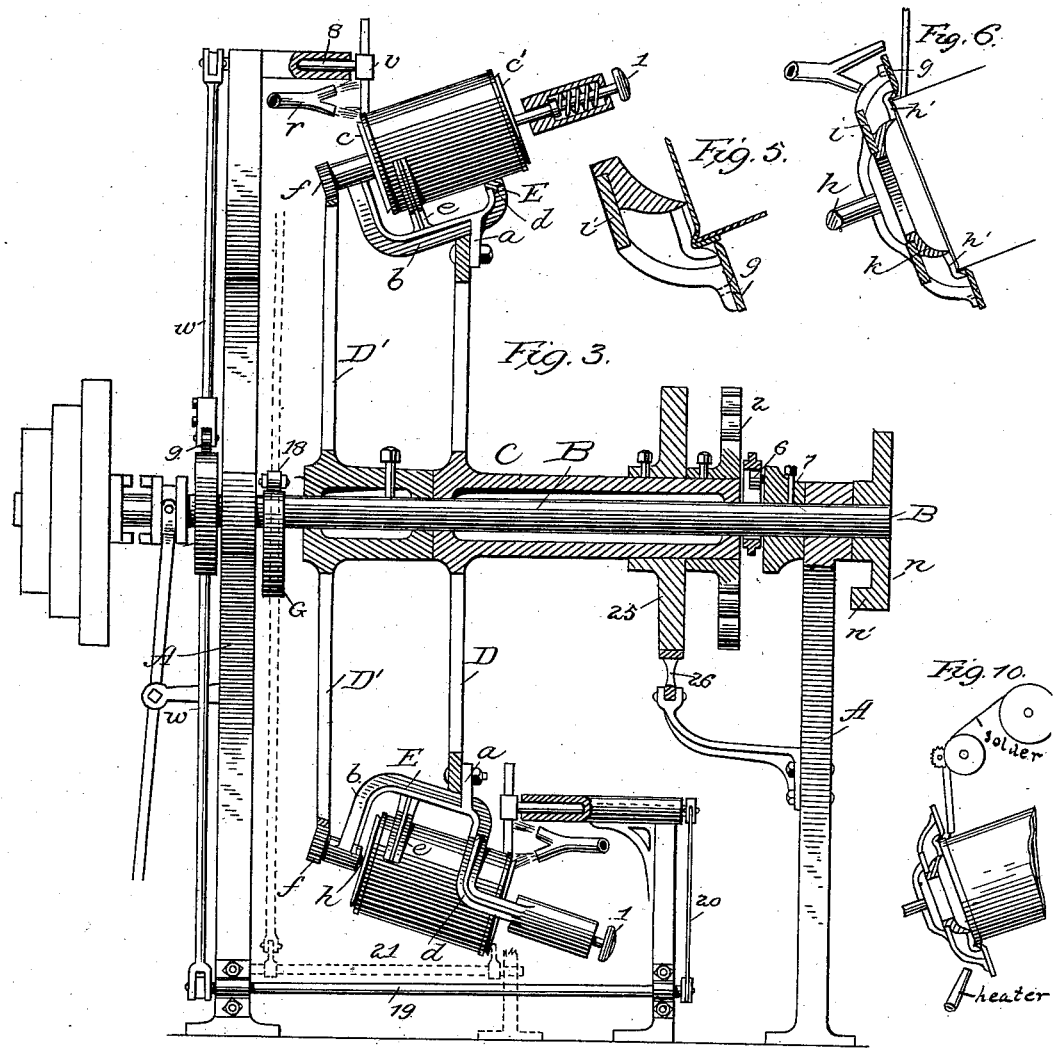
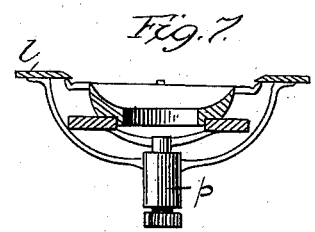
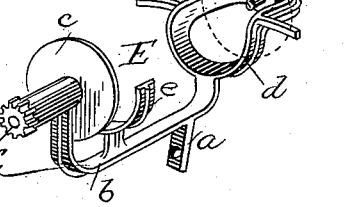
Attest:
Walter Donaldson
F. L. Middleton
Inventor
Wm. D. Brooks
by Ellis Spear
Atty.
N. PETERS, Photo-Lithographer, Washington, D. C.

United States Patent Office.

WILLIAM D. BROOKS, OF BALTIMORE, MARYLAND.

CAN-SOLDERING MACHINE.

SPECIFICATION forming part of Letters Patent No. 352,034, dated November 2, 1886.

Application filed June 2, 1886. Serial No. 203,953. (No model.)

*To all whom it may concern:*

Be it known that I, WILLIAM D. BROOKS, of Baltimore, in the State of Maryland, have invented a new and useful Improvement in Can-Soldering Machines; and I do hereby declare that the following is a full, clear, and exact description of the same.

My invention relates to can-soldering machines, and particularly to that class in which the cans are carried upon a vertical table arranged to revolve intermittingly.

The object of my invention is to provide a machine simple in construction and efficient in action for soldering the tops and bottoms of the cans during one revolution of the table which carries the same.

My invention consists in the various devices and combination of devices hereinafter particularly described.

In the accompanying drawings, Figure 1 represents a side elevation of the machine complete with the chutes for delivering and discharging the cans from the machine. Fig. 2 is an elevation of the opposite side. Fig. 3 is a central vertical section with the main driving-shaft in side elevation, and with the soldering mechanism at the top and bottom also in elevation, some of the parts of the machine being shown in section and some in dotted lines. Fig. 4 represents a detail view of the mechanism for feeding the solder forward. Figs. 5, 6, 7, 8, and 9 represent detail views, the first three in section and the latter two in perspective, of the can-seats and can-supporting devices. Fig. 10 shows the manner of soldering without the use of an iron, the flame-tube in this case being arranged about opposite the solder-feeding device.

In the drawings, A A' represent the opposite sides of the frame which supports the working parts of the machine, the driving-shaft B having its bearings in this frame. Upon this shaft is supported a long sleeve, C, which is connected to the shaft by a pawl-and-ratchet mechanism, so that while the shaft has a continuous rotary movement the sleeve C is operated intermittingly. This sleeve supports the vertical table D, which has secured to it, upon its outer periphery, can-holders E, sixteen of these being shown; but it will be understood that more or less may be provided. These holders are secured to the table by brackets $a$, the holder being held in an inclined position, as shown. These holders consist of the bracket $b$, with sockets at either end supporting holding-disks $c$, which are designed to clamp the two ends of the can. A yoke, $d$, is secured to the bracket at one end and holds the can accurately in proper position, while at the same time it does not interfere, on account of its peculiar form, with the soldering of the can. The clamping-disk at this end has its spindle extending through the socket of the bracket, and in the recess within the same is a coiled spring which tends constantly to keep it pressed against the can. The disk at the opposite end has no movement in the socket, so that the can is pressed constantly against said disk. The spindle of the disk $c'$ terminates in a cap-piece, 1, which is manipulated, as hereinafter fully described, to allow the can to be discharged from between the clamping-disks or to permit of a fresh can to be introduced. At the opposite end of the bracket, a little in front of the clamping-disk at this end, a curved arm is secured to the said bracket. (Indicated at $e$.) This arm is formed in the shape of a half-circle, and is adapted to support this end of the can, so that when the clamping-disks are brought together against the ends of the can, the can will be in proper position to be held thereby. The intermittent motion of the table is communicated from the driving-shaft in substantially the same way as shown in Letters Patents granted to me on the 4th day of April, 1882, No. 256,098, and therefore need not be particularly described, the means consisting of the ratchet-wheel 2, carried upon the sleeve C of a table, and a spring-pawl, 3, mounted upon a lever, 4, pivoted upon a post, 5, which extends up from the frame of the machine, the connection between the pawl and its arm and the main shaft consisting of a loop which encircles the shaft, the said loop being operated by a roller, 6, projecting from the face of a collar, 7, rigidly secured and revolving with the main shaft. This roller, as it describes a circle larger than the main shaft, depresses the loop at one point, and consequently the pawl, which is carried upon the end thereof, slips freely over the teeth of the ratchet, and in the continued movement of the roller the loop is lifted again, which lifts the pawl and its arm, and thus feeds the ratchet-wheel, the sleeve, and the table connected therewith one step.

While the table carrying the can-holders is moved intermittingly the cans themselves must be rotated continuously, whether the table is being moved or not, and for this purpose I provide a wheel, D', the hub of which is rigidly secured to the main shaft, as shown in Fig. 3, and the outer periphery of this wheel is provided with teeth formed upon an incline, as shown in the said figure. The ends of the spindles of the disk $c$ extend through the sockets of the supporting-bracket, and are provided with small pinions $f$, and these pinions gear with teeth of the wheel D', the teeth of the said wheel being formed on an angle to correspond with the inclination of the cans. It will thus be seen that as the movement of the shaft is continuous, and the wheel D' is secured thereto, it will have a continuous rotary movement, which movement will be transmitted to the cans through the pinions and their holding-disk, so that the cans themselves will have a continuous rotary movement independent of the movement of the table supporting the same.

In Figs. 5 and 6 I have shown in section a form of seat for the can which may be used instead of the disk $c$. As shown, this seat consists of the ring $g$, secured to supporting-arms, which are held upon the end of the spindle $h$, to which the small gear $f$ is secured. Below the line of the ring $g$ a second ring, with an annular opening, is secured to the frame, which constitutes a part of the seat, and upon this ring (marked $i$) the seat proper rests, as shown in Fig. 5. This seat consists of a body portion, $k$, having toe-pieces $k'$ projecting at four points, as shown in Fig. 9, and these toe-pieces support the can, as shown in Fig. 6. The ends of the pieces $k'$ are turned up, as shown, in order that the can may be accurately centered, and the seat itself is held in place by means of the ring $g$ extending over the points of the toe-pieces. This ring is removable, and when it is desired to put in a seat for a smaller can a larger ring is substituted therefor after the seat is in place.

In Fig. 7 a slightly modified form of seat is shown. In this a half-ring, $l$, is substituted for the ring $g$ in Fig. 6, and it is supported from the socket of the bracket $b$, so that it does not turn. With this exception the construction shown is similar to that just described.

In Fig. 1 the feeding-chute is shown at E' with the discharge-chute immediately below it, inclining, of course, in the opposite direction. After the soldered can has been discharged, the empty holder moves into position, in the ordinary action of the machine, in front of the feeding-chute, and it is necessary to provide some means for lifting the clamping-disk $c'$, which is forced down to its fullest extent by its spring after the can has been discharged therefrom, in order that a fresh can may be fed into place. For this purpose I have provided the simple mechanism shown in Fig. 2. It consists of the lever $m$, pivoted upon an arm secured to the main frame of the machine, so that it has lateral movement thereon, and this movement is imparted to it by means of a disk, $n$, on the end of the main shaft, having a cam, $n'$, upon its inner face, this cam increasing from the thickness of the disk to the desired thickness, as shown in section in Fig. 3. This cam-face is in line with the end of the lever $m$, which carries a pulley, $o$, and in the revolution of the disk $n$ this cam-face bears against the pulley $o$, and moves the end of the lever inward, throwing its outer end outward. After the high part of the cam has passed over the pulley $o$, the front end of the lever is returned by means of a light spring, $p$. The outer end of this lever is forked, and the forks have a small cross-bar upon their outer ends, which makes them approximately T-shaped. In the movement of the table, the parts being all properly timed, as a can-seat moves into position to discharge its can, the cap-piece 1 passes over the cross-bar of the lever $m$, and at the moment that the can is ready to to be discharged, the empty can-seat above it is ready to receive a fresh can, and at this instant the high part of the cam $n'$ strikes the pulley $o$ of the lever $m$ and depresses it, thus throwing the forked ends of the lever outward, and as they are under the cap-pieces 1, which are secured to the holding-disk $c$, these disks are thrown outward, and in the first case the can is released and discharged, while in the second case the can is allowed to roll into place. In the continued movement of the machine the high part of the cam $n'$ leaves the pulley $o$ of the lever $m$, and the spring $p$ returns the outer ends of the lever to their normal position, and this action is continued in its proper way as long as the machine is operated. In the step-by-step movement of the table the can leaves the feeding-chute and advances one step, the can being revolved all the time, as heretofore explained, by means of the large gear-wheel meshing with the pinions of the holding disks or seats. At the first and second stations, above the feeding-chute, flame-tubes $q\,q$ are provided, and the end of the can is properly heated to receive the solder. At the third station the soldering mechanism is situated, and the flame-tube, with two branches, is provided here, as shown at $r$, the upper branch being adapted to deflect the flame against the solder-tube, while the lower branch strikes it against the edge of the can. After the can is properly soldered, as hereinafter explained, it passes step by step to cooling-stations $s\,s\,s$. At the next two stations we have not shown either cooling or heating devices; but, if found necessary, these may be provided. It will be seen that at the upper soldering-station, the can being held at an incline, the bottom of the can (we will say) is being soldered, and as the can-holders are held rigidly in this inclined position as the table revolves the inclination will be changed, and when it passes the central station, between the upper and the lower stations, on the left, as shown in Fig. 1, the bottom of the can will begin to assume the highest point of inclination, and the top of the can the lowest—in other words, reversing the position of the can from that which it holds while at the point directly opposite.

At the stations t t flame-tubes are provided to heat the opposite end of the can, and at the station u soldering mechanism is provided, and the flame-tube having two branches, all the parts at this point being in duplicate of the mechanism referred to in the upper part of the machine for soldering the opposite ends of the can. After leaving the station u, which is a soldering-station, the next three stations are cooling-stations, and the next is opposite the discharge-chute.

I will now describe the soldering mechanism, and as the mechanism is alike both above and below for soldering opposite ends the description of one will suffice.

The frame of the machine upon one side extends upward and terminates in two arms, one of which supports the soldering-iron and the other the solder and the mechanism for feeding the same. The solding-iron is of ordinary shape, and has a limited amount of movement in the surrounding collar v, which is secured to an arm, v', mounted upon a rock-shaft, 8, supported upon a sleeve projecting from the frame of the machine. This rock-shaft extends through the sleeve and frame, and is connected, by means of a small arm, to a rod, w. A pulley, 9, secured to this rod w by means of an arm, bears upon the upper face of the cam x, which is rigidly secured to the end of the main shaft outside the frame, and when the high part of the cam comes in contact with the pulley the rod to which it is secured is lifted, and this action is transmitted through the rock-shaft 8 to the arms v' and the soldering-tool, which is lifted at the proper time to allow the can which has been soldered to pass from beneath the iron and another can to take its place, the movement being so timed that at the instant one can has left its seat and another taken its place the concentric part of the cam has been reached, and the soldering-iron, through its connections, has been lowered, and the soldering again begins. The movement of the soldering-iron is limited by means of a stop, which encircles one side of it, as shown at 10, this stop being so adjusted each day that the necessary movement will be provided for, and also the amount of wear which occurs to the irons. Upon the opposite arm of the frame is supported the solder holding and feeding devices.

Upon a bracket, 11, from the arm of the frame is supported the reel upon which the solder-wire is wound, and the end of the wire passes first between the face of a drum, 12, and the serrated face of a disk, 13, directly beneath the same, the drum being secured to a gear-wheel and the disk to a pinion in mesh with the said wheel. The gear-wheel also constitutes a ratchet-wheel, and is acted upon by a pawl, 14, on the same shaft, which receives motion from a rod, 15, thus moving the ratchet-wheel step by step to feed the solder from the roll. To carry the solder from the point where it leaves the feeding mechanism to the can to be soldered, I provide a tube, 16, slightly bent at its end and in line with the edge of the can to be soldered, so that the solder is applied directly to the seam in front of the iron, and as the can is hot the solder is readily melted, both by the heat of the can and the action of the flame from one of the branches of the flame tube, and as it passes under the soldering-iron is thoroughly acted upon, and as the can is held in an inclined position it is thoroughly sweated and none of the solder is wasted.

As it is desirable to apply the solder at a point upon the can in front of the soldering-iron, the tube must necessarily be brought into a position below the line of the soldering-tool, and after one can has been soldered and another is to be brought into position beneath the tool the solder feeding tube must be lifted from its normal position, in order to allow the next can to come into proper position. This is done by making the tube in two parts and hinging them, as shown, and connecting the forward part by a link-connection with the collar v of the soldering-tool, so that when the said tool is lifted by the mechanism heretofore described, in order to allow a fresh can to be brought under the irons, the same movement will lift the end of the solder-tube and remove it from the path of the approaching can. The link upon the end of the tube also gives it sufficient weight to return it to its proper position.

The mechanism by which the rod 15 is operated to move the pawl, and thereby its ratchet-wheel, consists of a rod, 17, pivoted upon a bracket on the main frame, its forward end being connected to the rod 15 by a link-connection, as shown, while the opposite end is weighted. Movement is imparted to this rod 17, through it to the rod 15, by means of a cam, G, mounted on the main shaft inside the frame, as shown in Fig. 3, and this cam acts upon a pulley, 18, secured to the rod 17, so that the high part of the cam lifts the rear end of the rod 17, which depresses the rod 15, and moves the ratchet forward; and when the low part of the cam comes into action the weight will depress its rod, and the rod 15 will be moved upward and pass the pawl, to be returned for a fresh hold. The soldering and solder-feeding devices duplicated below are operated in the same way and by a continuation of the same mechanism which operates the same device at the upper part of the machine. The rod w extends down to the bottom of the frame, where it is connected with the rock-shaft 19, and this rock-shaft is connected to the rock-shaft of the soldering-tool by means of a rod, 20. The rod 15 also extends down to near the bottom of the machine, where it is connected by means of an arm to the rock-shaft 21, (shown in dotted lines in Fig. 3,) and connection is made between this rock-shaft and the pawl for feeding the solder by means of the arm and short rod 22. (Shown in Fig. 2.) As shown in Fig. 1, I have provided ribs 23 between the can-seats, in order that the cans, as they are fed down to the holders, may not fall in between the can-seats, but will be guided into the seat.

At the lower end of the feeding-chute I have provided a wire loop, 24, in order to prevent the can from rising through any friction with the parts of the machine in passing, as the pressure of the cans behind would tend to force the cans against the machine, and this will obviate any danger of this kind. As shown in Figs. 2 and 3, a disk, 25, having a smooth periphery, is secured to the sleeve of the turn-table, and a brake, 26, pivoted upon the frame, bears against it to prevent irregular movement or jarring of the machinery connected therewith. When smaller-sized cans are to be soldered, an adjustment of the solder-feeding mechanism and the feeding-tube is necessary, and this may be done in any suitable way, the other connections being unchanged, the end of the pawl-arm being provided with holes, so that the rod 1 may simply be secured to the pawl nearer the end of the arm, the result of this being to reduce the amount of the feed, which would be desirable in smaller sizes of cans.

It will be obvious that while I have described a soldering-iron as used in connection with the machine, it is not absolutely necessary, and may be dispensed with without departing from the spirit of my invention, as the solder-feeding tube automatically delivers the solder against the edge of the can, which has been thoroughly and uniformly heated by its passage past the flame-tubes, and their action is sufficient to thoroughly solder the can. When no soldering-iron is used, the solder will be applied upon one side and the flame upon the opposite side of the can, as in Fig. 10. It will also be observed that as the solder-wire is fed directly against the heated edge of the can it is melted as it comes in contact therewith, and no cutting device is required. Instead of the wire solder, a solder bath may be substituted at the lower part of the machine. In the use of a soldering-iron with the branched flame-tube the ring $g$ of the can-seat plays a very important part, as it shields the body of the can from the flame, and thus prevents scorching of the body, while at the same time the iron and the edge of the can are thoroughly heated.

I claim as my invention—

1. In a can-soldering machine, the combination, with the main shaft adapted to move continuously, of the vertically-arranged table adapted to move intermittingly, carrying the inclined can-holders, means for moving the table intermittingly, means for revolving the cans continuously, flame-tubes for heating the edges of the cans, and automatic mechanism for supplying the solder, substantially as described.

2. In a can-soldering machine, the combination, with the main shaft adapted to move continuously, of the vertically-arranged table carrying inclined can-holders, means for moving the table intermittingly, means for revolving the cans continuously, suitable solder devices, and means for supplying the solder, substantially as described.

3. In a can-soldering machine, the combination, with a continuously-revolving main shaft, of a table carrying can-holders and having an intermittent motion, the can-holders being arranged upon said table in an inclined position, means for rotating said cans continuously, and solder-stations arranged upon the machine, each supplied with a set of soldering devices, and means for supplying solder, whereby the cans at one inclination are acted upon by one set of soldering devices to solder one end of the can and at the opposite station, at another inclination, are acted upon by soldering devices to solder the other end of the can, substantially as described.

4. In a can-soldering machine, the combination, with the continuously-revolving main shaft, of a table carrying can-holders and having an intermittent motion, the can-holders being arranged in an inclined position, means for rotating the said cans continuously, means for supplying solder arranged at stations upon the machine, whereby the solder is supplied to one end of the can at one inclination thereof from one station and at the opposite end of the can, at another inclination thereof, from the other station, both ends of the can being thereby soldered in one revolution of the table, substantially as described.

5. In a can-soldering machine, the combination, with the main shaft, of a vertically-arranged table carrying inclined can-holders, means for revolving said cans continuously, flame-tubes for heating the cans before they reach the soldering-stations, solder-supplying devices arranged at points opposite to each other and upon different sides of the machine, adapted to feed solder directly against the heated edges of the can, and to different ends thereof, and mechanism connecting the two, whereby the action of the two sets of devices is simultaneous, substantially as described.

6. In a can-soldering machine, the combination, with a main shaft, of a table supporting can-holders in an inclined position, means for giving said table intermittent motion and for giving said cans a continuous motion, soldering devices, solder-feeding mechanism arranged opposite to each other, and mechanism for releasing the cans from the holders, whereby in the continuous movement of the machine the cans are received, soldered at both ends, and discharged, the soldering at each end being independent of the other, substantially as described.

7. In a can-soldering machine, the combination, with the main shaft, of the table carrying can-holders, said holders consisting of a bracket having a spring-actuated disk at one end, and a seat or disk at the opposite end, an arm, e, for supporting the can-body near one end, and a yoke, d, for supporting the can at the opposite end, substantially as described.

8. In a can-soldering machine, the combination, with a main shaft, of a table carrying inclined can-holders, of the duplicate solder-stations, each supplied with a set of soldering devices and means for supplying solder, heating-tubes arranged in advance of said solder-stations, and cooling-stations arranged in rear thereof, substantially as described.

9. The combination, in a can-soldering machine, of the main shaft, a wheel having intermittent motion carrying can-holders, means for rotating said holders, and the soldering-iron having a limited vertical movement, said iron being connected by an arm to a rock-shaft, said rock-shaft being operated, through a rod, w, by means of a cam on the main shaft, a soldering-iron arranged opposite to the first-named iron, and mechanism, substantially as described, between said iron and the rod w, whereby the action of the cam upon said rod operates simultaneously upon the two soldering-irons, substantially as described.

10. The combination, in a can-soldering machine, of a main shaft, a table carrying can-holders, means for rotating said holders, soldering-irons arranged opposite each other, and means for operating them simultaneously from one point, solder-feeding devices arranged in proximity to the soldering-irons both at the upper and lower part of the machine, and mechanism, substantially as described, operated by a cam on the main shaft, whereby the solder is fed to the cans simultaneously, substantially as described.

11. In a can-soldering machine, the combination, with a table carrying can-holders, of mechanism for allowing the cans to be discharged from the holder and to be received thereby, consisting of the pivoted lever m, having forked ends adapted to engage with cap-pieces 1 on the can-holders, the opposite end of said lever being acted upon by a cam on the main shaft, whereby the outer ends of the lever are thrown outward and the spring-clamping disks raised, substantially as described.

12. In a can-soldering machine, the combination, with a table carrying can-holders, of flame-stations and an automatic solder-feeding mechanism consisting of the drum 12, a disk, 13, having a roughened face, a gear mounted on the drum, a pinion on the disk meshing with the said gear, a pawl acting upon the teeth of the gear, and mechanism for moving the pawl, substantially as described.

13. In a can-soldering machine, and in combination therewith, a holder for the cans having a seat provided with the removable ring g and a removable seat, k, having toe-pieces k', substantially as described.

14. In a can-soldering machine having a table carrying can-holders, soldering mechanism, mechanism for feeding the solder to the cans, and a flame-tube having branches, one branch for directing a flame against the tool and the other for directing the flame against the can, substantially as described.

15. In a can-soldering machine, the combination of the table carrying the can-holders, provided with seats for the cans, a soldering-iron, mechanism for feeding the solder to the cans, a flame-tube having two branches, one for directing the flame against the tool and the other against the can-edges, and a ring or plate, g, upon the holder intermediate between the two branches of the flame-tube, substantially as and for the purpose set forth.

16. In combination with a soldering-machine, the table carrying can-holders, a soldering-iron, and solder-feeding mechanism consisting of means for drawing the solder from the reel, and a tube made in two parts hinged together for directing the solder to the seam of the can, the free end of the tube being connected by a link with mechanism for lifting it to allow the passage of the can beneath it, substantially as described.

17. In combination with a soldering-machine, a vertically-arranged table carrying inclined can-holders mounted thereon, flame-tubes for heating the edges of the cans, and mechanism for feeding the solder, consisting of automatic means for drawing the solder from the reel and a tube extending from the feeding-rolls to the periphery of the can, substantially as described.

In testimony whereof I have signed my name to this specification in the presence of two subscribing witnesses.

WM. D. BROOKS.

Witnesses:
JOSEPH H. EACHUS,
LEONARD BROOKS.